T. S. FRANTZ & W. H. TROXELL.
FERTILIZER DISTRIBUTING ATTACHMENT TO CULTIVATORS.
APPLICATION FILED MAR. 22, 1910.

978,363.

Patented Dec. 13, 1910.

2 SHEETS—SHEET 2.

Tilghman S. Frantz
Willoughby H. Troxell
Inventors

Witnesses by

Attorney

UNITED STATES PATENT OFFICE.

TILGHMAN S. FRANTZ AND WILLOUGHBY H. TROXELL, OF NEAR COPLAY BOROUGH, PENNSYLVANIA.

FERTILIZER-DISTRIBUTING ATTACHMENT TO CULTIVATORS.

978,363.  Specification of Letters Patent.  Patented Dec. 13, 1910.

Application filed March 22, 1910. Serial No. 550,940.

*To all whom it may concern:*

Be it known that we, TILGHMAN S. FRANTZ and WILLOUGHBY H. TROXELL, both citizens of the United States, and residing near the borough of Coplay, Lehigh county, State of Pennsylvania, have invented certain new and useful Improvements in Fertilizer-Distributing Attachments to Cultivators, of which the following is a specification.

Our invention consists in a fertilizer distributing attachment for cultivators as hereafter fully described in connection with the accompanying drawings and specifically pointed out in the claims; the main object of said invention being to provide for simultaneously supplying fertilizing material to the two rows of plants between which the cultivator is drawn.

Figure 1:
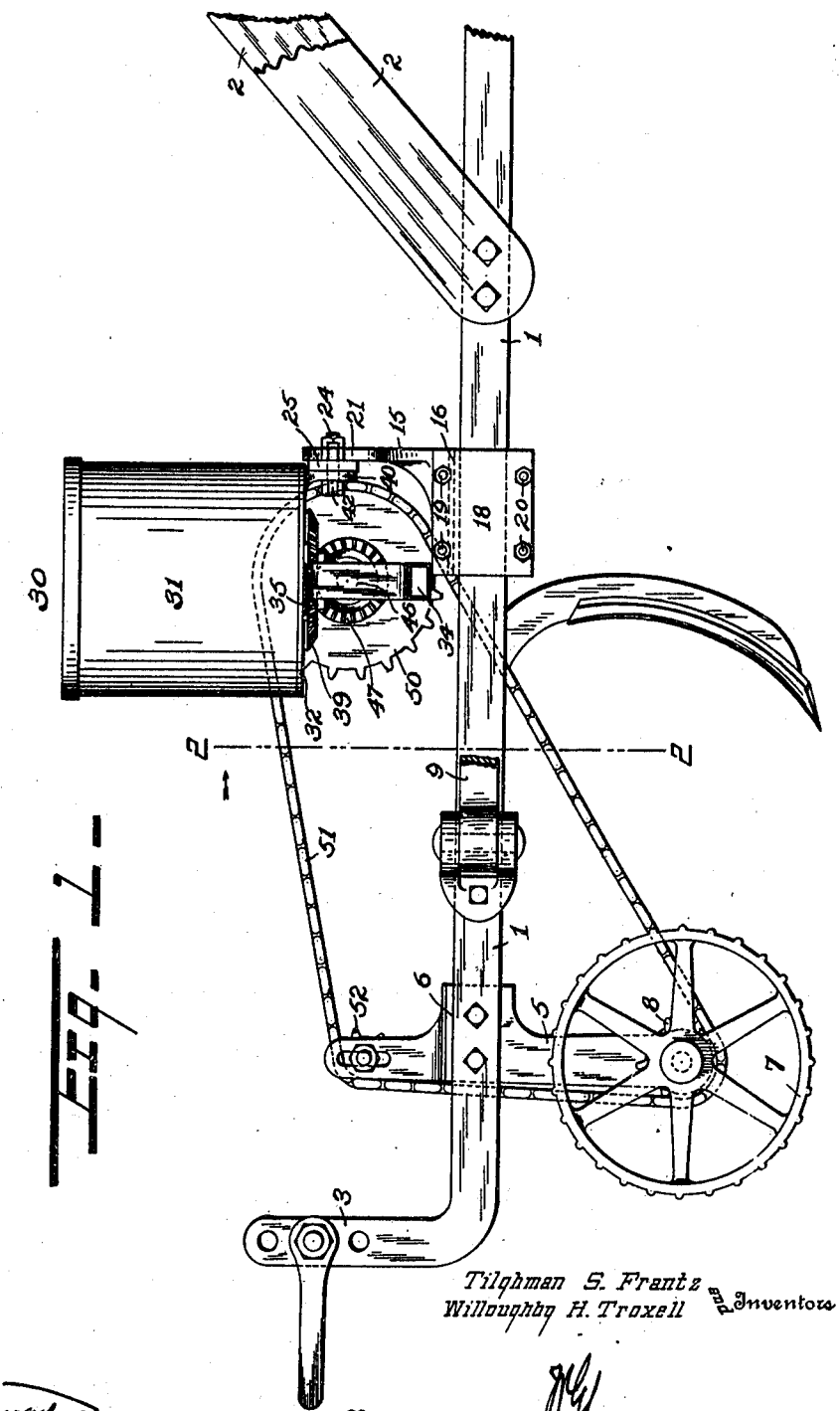
Figure 2:
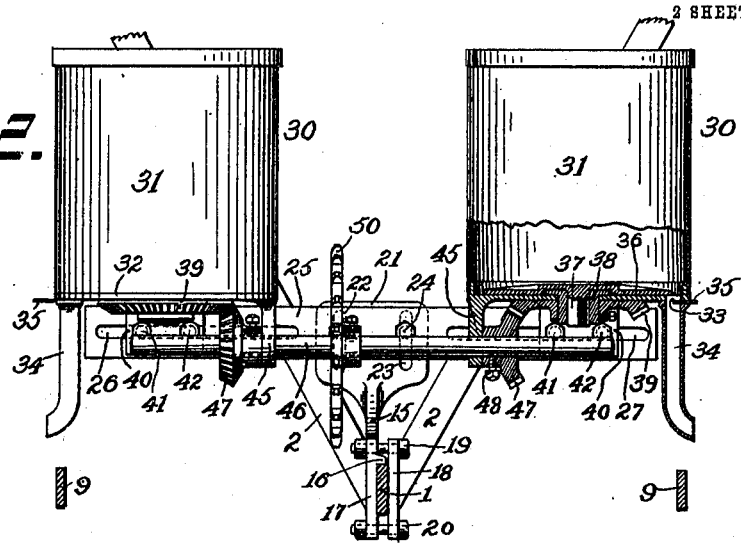
Figure 3:
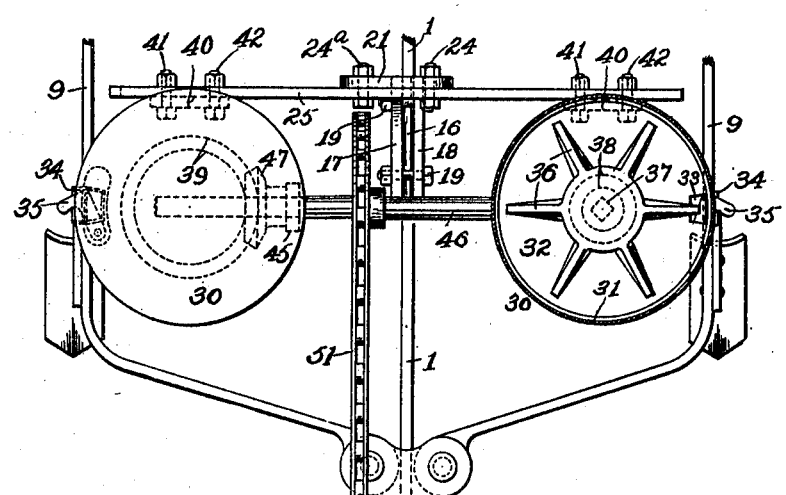

Figure 1 is a side elevation of the forward portion of a cultivator to which our attachment is applied, the near tooth being broken away to more clearly reveal the means of attachment to the central tooth beam. Fig. 2 is a front elevation of the fertilizer distributing mechanism showing the central beam of the cultivator to which it is attached, in cross-section on the line 2—2 of Fig. 1. Fig. 3 is a plan view of the fertilizer distributing mechanism showing also the forward portions of the cultivator to which it is attached.

The central share-beam 1 of the cultivator, which is rigidly connected to the upwardly inclined spreading handle-bars 2, 2, has its forwardly extending portion 3, to the end of which the draft horse is commonly attached, provided with a suitable bracket 5, 6 in which is mounted a supporting wheel 7. A sprocket wheel 8 is fixed to the hub of this wheel as shown, and is utilized as hereafter described, to drive the feed devices of the attached fertilizer distributing mechanism. The share-beams 9, 9 on either side of the main beam 1, may be adjusted as usual to expand or contract the width of the cut made by the cultivator, our attachment being applied in a simple manner to the rigid central beam 1 without in any way affecting the normal operation of the cultivator mechanism.

Our attachment comprises in the first place, a separate pedestal bracket or supporting frame 15, which is carried upon the center beam 1 by means of a flange 16 on the lower portion 17 thereof, and is rigidly secured to said beam in properly adjusted position by a clamping plate 18 and clamping bolts 19 and 20 as shown. The upper portion of this bracket is an integrally formed clamping plate 21 extending crosswise of the machine above the beam 1 and in a plane at right angles to the latter, and said plate is provided with parallel vertical slots 22 and 23 adjacent the respective side edges thereof. To this clamping plate 21 of the bracket is secured in vertically adjusted position, by means of bolts 24 and 24$^a$, a transverse hopper-carrying bar 25, the oppositely-extending ends of which are provided with horizontal slots 26 and 27 respectively; said bar serving to carry a fertilizer hopper 30 at each end thereof. Each of these hoppers 30 as shown, comprises a cylindrical body 31 having a circular bottom plate 32 provided with a discharge opening 33 communicating with a discharge spout 34, and with a regulating valve 35. Each hopper is also provided with a rotary spider 36 serving to agitate and to positively feed the fertilizer material; said spider, as shown, having an integrally formed angular shaft portion 37 with a bearing sleeve 38 thereon extending through the hopper bottom and carrying a bevel gear 39, through which to impart rotary motion to the feed spider 36. To provide for securing these hoppers 30 to the carrying bar 25, and for mounting the driving mechanism for said feed spider, each hopper bottom 32 is provided on its under side, first with a depending bar-clamping bracket 40, located to one side of the hopper center and having holes for clamping bolts 41, 42 which are adapted to pass through a slot 26 or 27 of the carrying bar and adjustably clamp the hopper to the latter; and second with a depending bearing lug 45 arranged at right angles to said bar-clamping bracket 40, and serving in connection with the similar bearing lug upon the other hopper, to support a rotary shaft 46 for driving said feed spider 36. This shaft has similar bevel pinions 47, 47 adjustably fixed thereto by means of set screws 48 so as to be retained in mesh with the bevel gear 39 of the rotary feed spider in whatever position the hoppers may be set upon the carrying bar 25. The shaft 46 is also provided with a sprocket wheel 50 by means of which rotary motion is imparted to it from the wheel 7 through a drive chain 51 which is passed over a suitably mounted idler 52 as shown.

It will be readily seen that our simply constructed and applied mechanism may be readily attached to or removed from the cultivator without in any way affecting the normal operation of the latter, and that the hoppers may be arranged to properly supply fertilizer to differently spread rows of plants while the machine is simultaneously carrying on the usual cultivating action upon the intervening ground.

What we claim is:—

1. In combination with a cultivator having a forwardly projecting central beam provided with a supporting wheel, a pedestal bracket rigidly secured to said beam and formed with a clamping plate arranged in a plane at right angles thereto, a transverse hopper-carrying bar secured to said clamping plate, hoppers on the oppositely extended end portions of said transverse bar each having a bottom formed with a depending shaft-bearing lug arranged in alinement with the centers of the hoppers, and with a depending bar-clamping bracket arranged at right angles to said bearing lug and out of alinement therewith, a rotary feed-device in each of said hoppers, a drive-shaft therefor mounted in said depending lugs on the hoppers, and means for driving said shaft from the supporting wheel, substantially as set forth.

2. In combination with a cultivator having a forwardly projecting central beam provided with a supporting wheel, a pedestal bracket adjustably clamped to said beam and formed with a transverse clamping plate arranged in a plane at right angles thereto and having parallel vertical slots, a transverse hopper-carrying bar adjustably bolted to said vertically slotted clamping plate and having its oppositely extending ends provided with horizontal slots, hoppers adjustably secured to the respective horizontally-slotted ends of said transverse bar and each provided with a rotary feed-device, a drive-shaft mounted in depending lugs on said hoppers and provided with horizontally adjustable drive-pinions for said feed-devices, and means for driving said shaft from the supporting wheel, substantially as set forth.

In testimony whereof, we affix our signatures, in the presence of two witnesses.

TILGHMAN S. FRANTZ.
WILLOUGHBY H. TROXELL.

Witnesses:
HARRY B. D. METZGER,
ALFRED H. LEH.